(12) United States Patent
Dawson-Haggerty et al.

(10) Patent No.: US 11,562,449 B2
(45) Date of Patent: Jan. 24, 2023

(54) SYSTEMS AND METHODS FOR PROVIDING DYNAMIC BUILDING INTERFACES

(71) Applicant: Building Robotics, Inc., Oakland, CA (US)

(72) Inventors: Stephen Dawson-Haggerty, Piedmont, CA (US); Vincenzo Trincia, San Francisco, CA (US)

(73) Assignee: Building Robotics, Inc., Oakland, CA (US)

( * ) Notice: Subject to any disclaimer, the term of this patent is extended or adjusted under 35 U.S.C. 154(b) by 156 days.

(21) Appl. No.: 17/004,754

(22) Filed: Aug. 27, 2020

(65) Prior Publication Data

US 2022/0067855 A1    Mar. 3, 2022

(51) Int. Cl.
| | |
|---|---|
| *H04W 12/08* | (2021.01) |
| *G06Q 50/16* | (2012.01) |
| *G06F 16/9535* | (2019.01) |
| *G06F 16/2457* | (2019.01) |
| *G06F 16/9538* | (2019.01) |
| *G05B 19/042* | (2006.01) |
| *G06F 3/0485* | (2022.01) |

(Continued)

(52) U.S. Cl.
CPC ......... *G06Q 50/163* (2013.01); *G05B 19/042* (2013.01); *G06F 3/0485* (2013.01); *G06F 16/24578* (2019.01); *G06F 16/9535* (2019.01); *G06F 16/9538* (2019.01); *G06K 7/1413* (2013.01); *G06Q 10/10* (2013.01); *G06Q 30/0185* (2013.01); *G07C 9/00* (2013.01); *H04L 67/306* (2013.01); *H04L 67/52* (2022.05); *H04W 12/04* (2013.01); *H04W 12/08* (2013.01); *G05B 2219/25011* (2013.01)

(58) Field of Classification Search
CPC ...... G07C 9/00174; G07C 2009/00261; G06F 16/24578; H04W 12/08; H04W 12/04
USPC ................................................. 235/382, 375
See application file for complete search history.

(56) References Cited

U.S. PATENT DOCUMENTS

| | | |
|---|---|---|
| 6,363,419 B1 | 3/2002 | Martin, Jr. et al. |
| 7,039,423 B2 | 5/2006 | Daniel et al. |
| (Continued) | | |

FOREIGN PATENT DOCUMENTS

WO    20180128755    7/2018

OTHER PUBLICATIONS

PCT Search Report dated Dec. 3, 2021, for PCT Application No. PCT/US2021/045837, 11 pages.

*Primary Examiner* — Paultep Savusdiphol

(57) ABSTRACT

There is described a user mobile device and an enterprise gateway for providing dynamic building interfaces. The gateway receives a request for cards from the device, and the device receives the cards from the gateway in response to the request. Each card has a structure corresponding to one of multiple pre-defined templates. Each card has an assigned rank and is associated with a list of cards defined when the cards are ordered in accordance with the assigned rank. The assigned rank of each card is based at least in part on a user target profile associated with the user mobile device and the customer identification. The gateway comprises a processor that determines an assigned rank for each card based at least in part on a user target profile associated with the user mobile device and the customer identification. The device provides at least one card of the list of cards.

24 Claims, 15 Drawing Sheets

(51) Int. Cl.
*G06K 7/14* (2006.01)
*G06Q 10/10* (2012.01)
*G06Q 30/00* (2012.01)
*H04L 67/306* (2022.01)
*G07C 9/00* (2020.01)
*H04W 12/04* (2021.01)
*H04L 67/52* (2022.01)

(56) References Cited

U.S. PATENT DOCUMENTS

| | | | |
|---|---|---|---|
| 8,249,654 B1* | 8/2012 | Zhu | H04M 17/10 |
| | | | 235/382 |
| 8,285,329 B1* | 10/2012 | Zhu | G06F 21/629 |
| | | | 235/382 |
| 9,869,483 B1 | 1/2018 | Dawson-Haggerty et al. | |
| 9,888,337 B1* | 2/2018 | Zalewski | H02N 11/002 |
| 10,142,122 B1* | 11/2018 | Hill | H04L 12/2807 |
| 2002/0133545 A1 | 9/2002 | Fano et al. | |
| 2003/0050049 A1 | 3/2003 | Sundstrom | |
| 2003/0232618 A1 | 12/2003 | Le et al. | |
| 2005/0188406 A1 | 8/2005 | Gielow et al. | |
| 2005/0210514 A1 | 9/2005 | Kittlaus et al. | |
| 2009/0258595 A1 | 10/2009 | Gielow et al. | |
| 2013/0178159 A1* | 7/2013 | Xie | G06Q 30/0601 |
| | | | 455/41.1 |
| 2015/0109104 A1* | 4/2015 | Fadell | G08B 27/005 |
| | | | 340/5.7 |
| 2015/0109128 A1* | 4/2015 | Fadell | G08B 25/008 |
| | | | 340/540 |
| 2018/0068503 A1* | 3/2018 | Prasad | G07C 9/00309 |
| 2021/0336963 A1* | 10/2021 | Rovito | H04L 63/08 |

* cited by examiner

FIG. 7

| | Card Service | Customer ID | Building | Geo/Location | Upstream |
|---|---|---|---|---|---|
| 702 → | | 704 | 706 | 708 | 710 |
| 712 → | card: internal_1 | 47 | 222 State | [URL] | Internal Server |
| 714 → | card: internal_2 | 50 | 1509 France | Host_Name | Internal Server |
| 716 → | card: external | 47 | 1509 France | Geo_Region | External Server |
| | ⋮ | ⋮ | ⋮ | ⋮ | ⋮ |
| 718 → | default internal | — | — | coordinate | — |

SYSTEMS AND METHODS FOR PROVIDING DYNAMIC BUILDING INTERFACES

FIELD OF THE INVENTION

This application relates to the field of building management systems and, more particularly, to a system and method for providing dynamic building interfaces for user mobile devices associated with a building management system.

BACKGROUND

Building management systems are commercial systems that encompass many field devices and zones that aid in the monitoring and control of environmental operations of a building including security, fire safety, lighting, heating, ventilation, and air conditioning. These field devices may be widely dispersed throughout the building. The different zones of the building may have predetermined environmental settings based upon space and operator requirements. Some commercial systems allow occupants limited control of environmental conditions of offices, conference rooms, and other areas based on their personal preferences.

A conventional system has a dedicated device for each building and workplace function such that the devices associated with the system operate individually and separately. Operation of one or more function is cumbersome for employees and very difficult for other users of an applicable building, such as guests and visitors. Those people also find it challenging to access to related building information, such as parking or food venues withing the building premises, that are not typically or easily available for viewing on a building interface. In addition, most occupants of the building, particularly guests and visitors, are quite capable of operating their own portable devices but operation of a new device dedicated to the building may be undesirable and may not be worth the effort to learn. Thus, conventional building interfaces limit the opportunities for occupants of an applicable building to change environmental conditions to their personal preferences.

SUMMARY

In accordance with one embodiment of the disclosure, there is provided a dynamic interface approach for operating in coordination with building management systems. The approach integrates many different building and workplace functions so that they may perform in an integrated function. In addition to these functions, the system may provide non-building information that may be useful to occupants of the building, such as employees, guests, agents, or other users of the building as part of a workplace function. that is able to provide dynamic building interfaces to the occupant. The system may further provide multiple modalities to access these building and workplace functions, such as smart phones, desktop computers, voice interfaces, and interactive displays. Accordingly, the system provides one or more dynamic building interfaces to occupants of an applicable building.

One aspect is a method in a user mobile device. A request for multiple cards associated with a customer identification of a building management system is transmitted. Each of the multiple cards has a structure corresponding to one of multiple pre-defined user interface card templates. The multiple cards are received from an enterprise gateway in response to the request. Each of the multiple cards has an assigned rank and is associated with a list of cards defined when the multiple cards are ordered in accordance with the assigned rank. The assigned rank of a respective card is based at least in part on a user target profile associated with the user mobile device and the customer identification. One or more cards of the list of cards are provided at a display of the user mobile device.

Another aspect is a user mobile device comprising a communication component and an output component. The communication component is configured to transmit a request for multiple cards associated with a customer identification of a building management system and receive the multiple cards from an enterprise gateway in response to the request. Each of the multiple cards has a structure corresponding to one of multiple pre-defined user interface card templates. Each of the multiple cards has an assigned rank and is associated with a list of cards defined when the multiple cards are ordered in accordance with the assigned rank. The assigned rank of a respective card is based at least in part on a user target profile associated with the user mobile device and the customer identification. The output component is configured to provide at least one card of the list of cards.

Yet another aspect is a method of an enterprise gateway. A request is received from a user mobile device for multiple cards associated with a customer identification of a building management system. Each card has a structure corresponding to one of multiple pre-defined user interface card templates. An assigned rank is determined for each of the multiple cards based at least in part on a user target profile associated with the user mobile device and the customer identification. Each of the multiple cards is associated with a list of cards defined when the multiple cards are ordered in accordance with the assigned rank. The multiple cards are transmitted to the user mobile device.

Still another aspect is an enterprise gateway comprising a communication component and a processor. The communication component is configured to receive a request from a user mobile device for multiple cards associated with a customer identification of a building management system and transmit the multiple cards to the user mobile device. Each card has a structure corresponding to one of multiple pre-defined user interface card templates. The processor is configured to determine an assigned rank for each of the multiple cards based at least in part on a user target profile associated with the user mobile device and the customer identification. Each of the multiple cards is associated with a list of cards defined when the multiple cards are ordered in accordance with the assigned rank.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIG. 7 depicts an example implementation of a user interface card table that may be used to develop an interface for a user mobile device of FIG. 1.

DETAILED DESCRIPTION

Figure 1:
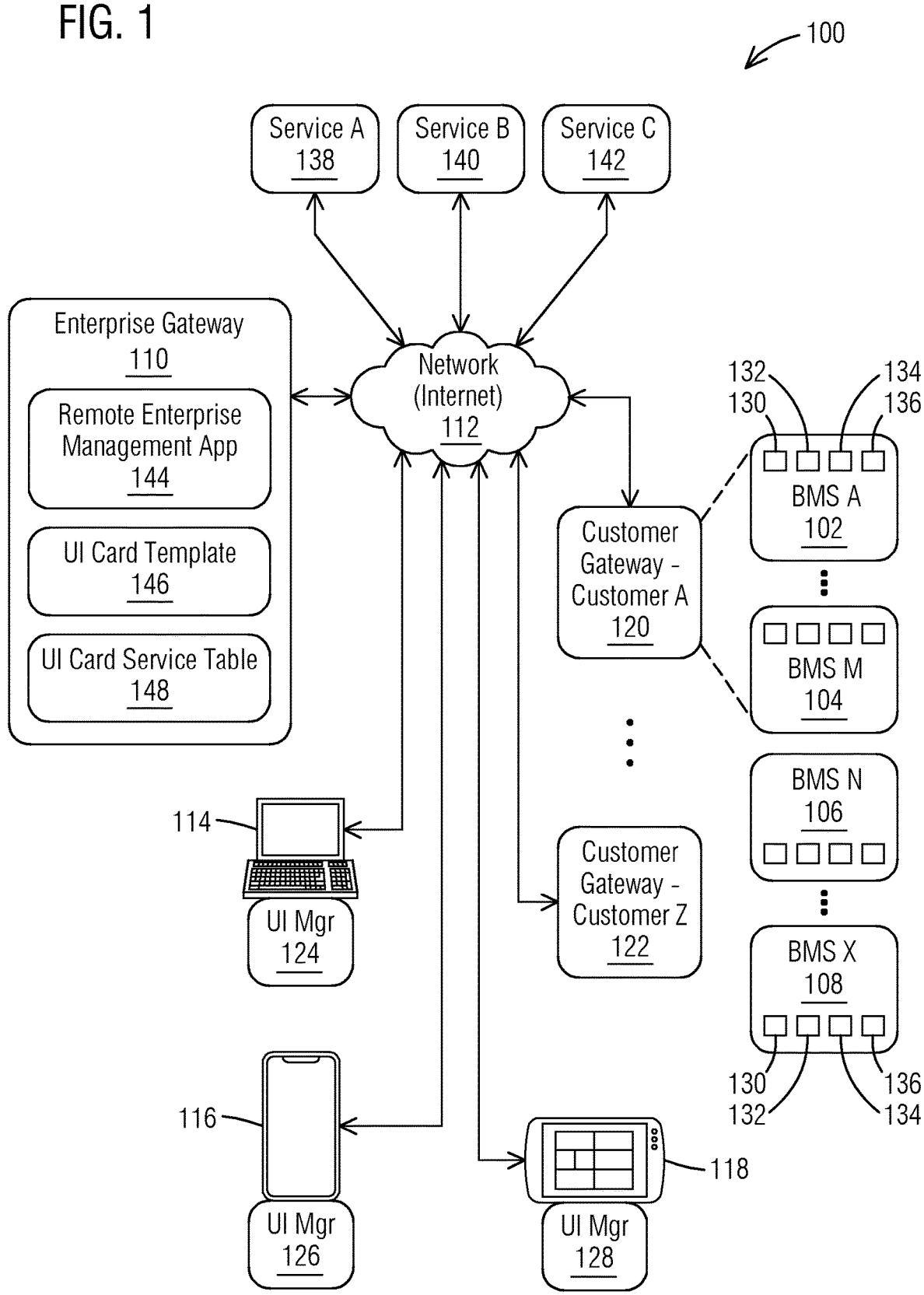
FIG. 1 is an illustration of an environment in an example implementation that is operable to employ techniques described herein.

Various technologies that pertain to systems and methods that facilitate a dynamic interface approach will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

This approach enables an enterprise customer to provide integrated, dynamic building interfaces to employees and building occupants on their own user mobile devices, in contrast to conventional systems that restrict content management capabilities to facility managers via fixed building devices and displays. The dynamic building interfaces may be managed remotely via an enterprise gateway that provides uniform deployment and rapid updates to user mobile devices. The dynamic building interfaces also provide relevant information based on user preferences in ranked order based on a scoring function for a given enterprise customer.

Referring to FIG. 1, there is shown a dynamic interface system 100 for operating in coordination with one or more building management systems 102-108. The dynamic interface system 100 includes an enterprise gateway 110 interconnected by a network 112 to user mobile devices 114-118 and one or more customer gateways 120, 122 associated with the building management systems 102-108. The enterprise gateway 110 may be deployed as a cloud service, or independently, for communication with the user mobile devices 114-118 and the customer gateways 120, 122. Examples of user mobile devices 114-118 include, but are not limited to, portable computing devices 114, mobile devices 116, tablet devices 118, desktop computing devices, kiosk-supported devices, wearable devices, and the like. Each user mobile device 112-116 includes a mobile app 122-124 that is registered with the enterprise gateway 110 for operation within the dynamic interface system 100. Each customer gateway 120 is associated with a particular customer and corresponds building management systems 102, 104 of the particular customer. The customer gateways 120, 122 interconnect its corresponding building management system or systems 102-108 to the enterprise gateway 110 via the network 112. In this matter, each customer gateway 120, 122, provides the enterprise gateway 110 with access and control of various subsystems of the corresponding building management system, such comfort (heating, ventilation, and air conditioning) subsystems 130, illumination subsystems 132, safety subsystems 134, or security subsystems 136. For some embodiments, the dynamic interface system 100 may also include one or more third party services 138-142.

The enterprise gateway 110 may employs service objects (also known as, card services) to receive data relevant to a pre-defined card for receiving data relevant to the respective service or functionality. In this manner, third party services 138-142 provide passive or interactive information managed by services external to the building management systems 102-108. Examples of the third party services 138-142 include, but are not limited to, services associated with news, weather, navigation, parking, accommodations, and food establishments. For example, the third party services 138-142 may provide reservation or ordering opportunities at parking areas, hotels, and restaurants in proximity to a building associated with the building management system 102-108. The third party services 138-142 may also apply to areas internal to the associated building while being managed by an external service. For example, the third party services 138-142 may provide information about events, conference rooms, and cafeterias of the associated building. Further examples of services or functionality include, but are not limited to, adjusting temperature, adjusting lighting, identification via a card reader at an entryway, booking a meeting room, booking a desk, finding a colleague; filing a work order, viewing traffic/commute information, and the like.

The enterprise gateway 110 may be deployed to provide and manage a modular set of user interface building blocks for different functionalities to user mobile devices 114-118. Examples of the modular components include user interface cards (cards) associated with different building and/or non-building functionalities. The module components may be managed by a remote enterprise management app 144 at the enterprise gateway 110 and a corresponding manager app 124-128 at each user mobile device 114-118. The remote enterprise management app 144 provides cards to each user mobile device 114-118, and the manager app 124-128 of each user mobile device provides one or more the cards at a display of the user mobile device. Although similar cards may be displayed by two or more user mobile devices 114-118, the manager app 124-128 of each user mobile device displays cards customized for each user mobile device and allows user selections based on the customized cards.

The enterprise gateway 110 is configured to receive inputs from an identified customer to commission, configure, or pre-define a list of cards for users associated with that customer. The user mobile devices 114-118 associated with the customer have, or will download, a corresponding manager app 124-128 for viewing the list of cards. The enterprise gateway 110 includes the remote enterprise management app 144, one or more card templates 146, and a card service table 148. Each card is pre-defined to provide a corresponding functionality when presented to a user by the corresponding mobile app. Also, each card may be based on a pre-defined template of the card template 146. Such list of pre-defined cards are maintained by the enterprise gateway 110 in the card service table 148 in association with the target information ("Target Info") for implementing or generating the respective card with an applicable card service.

The manager app 124-128 is download by a user to a user mobile device 114-118 associated with an identified customer. Upon login by the user with an applicable customer identification (i.e., a new user mobile device session), the manager app 124-128 receives a ranked list of cards associated with the user from the enterprise gateway 110 based on the customer identification and an applicable user identification. The customer identification corresponds to a customer gateway 120, 122 of the building management system. The manager app 124-128 displays one or more of the cards from the received list of cards. For some embodiments, the manager app 124-128 may adjust the cards to the uniformly meet the display size of the user mobile device 114-118. For another embodiment, the manager app 124-128 may allow scrolling for all cards based on a ranking order. The manager app 124-128 may also provide current user target information and meta data to the enterprise gateway 110, such as current user mobile device location, any current user input from a displayed card, and/or any scanned barcode (i.e., from equipment, desk or other nearby asset) requiring processing by the gateway. For each user mobile device 114-118 with an active session, the enterprise gateway 110 may fetch the card list for the user based on the customer identification, user identification, and other targeting data. For example, the targeting data may include device location to enrich each card in the list with other information, like card relevance, based on current user target information and meta data. The enterprise gateway 110 may obtain relevant service object data and rank resulting cards before transmitting back to applicable manager app 124-128 for the user mobile device 114-118.

Figure 2:
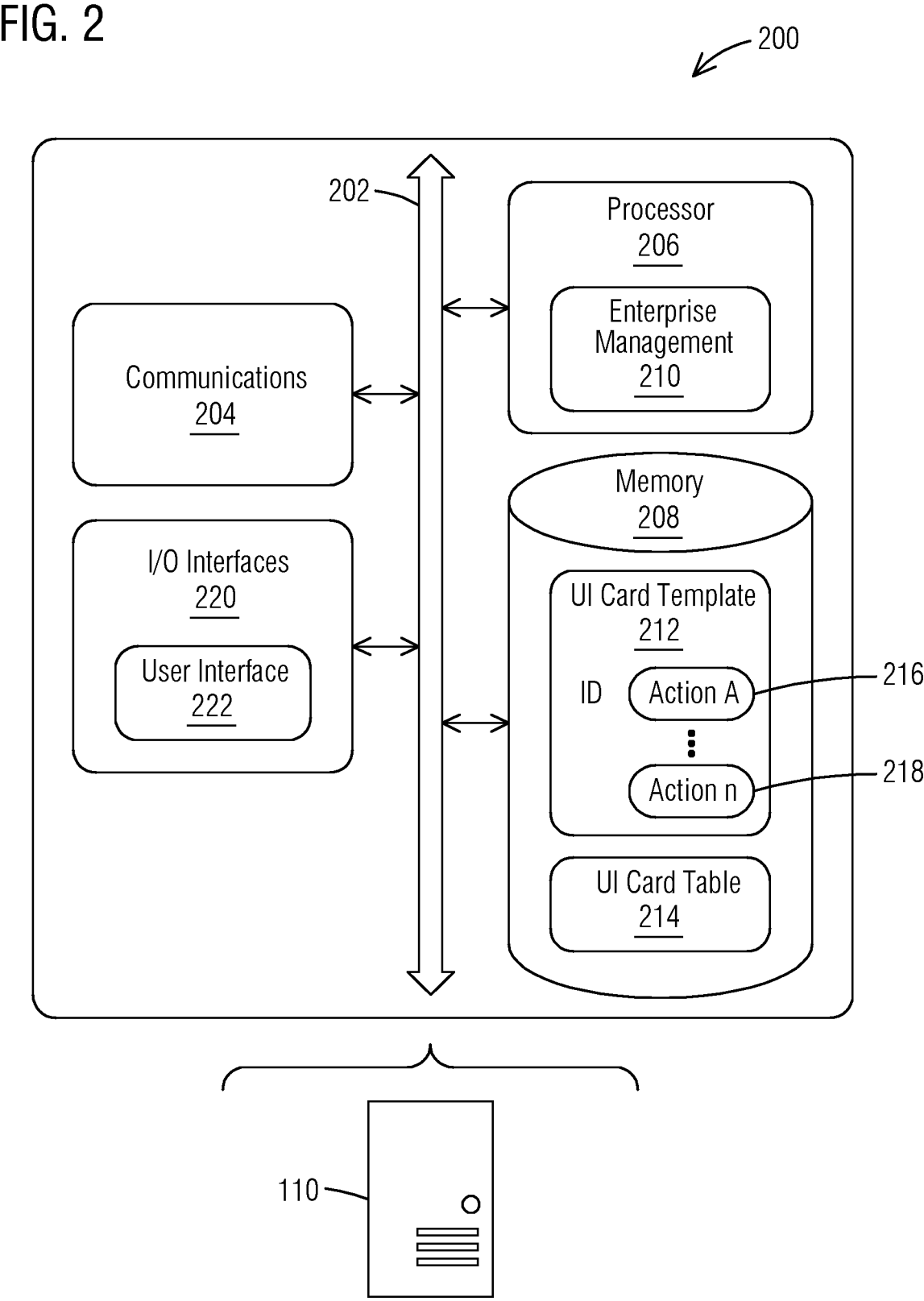
FIG. 2 is a block diagram of an example implementation of the enterprise gateway of FIG. 1.

FIG. 2 represents example device components 200 of the enterprise gateway 110 in accordance with the dynamic interface approach. The device components 200 comprise a communication bus 202 for interconnecting the other device components directly or indirectly, one or more communication components 204 communicating other entities via a wired or wireless network, one or more processors 206, and one or more memory components 208. The one or more processors 206 may execute code and process data received at other components of the device components 200, such as information received at the communication component 204 or stored at the memory component 208. The code associated with the enterprise gateway 110 and stored by the memory component 208 may include, but is not limited to, operating systems, applications, modules, drivers, and the like. An operating system includes executable code that controls basic functions of the enterprise gateway 110, such as interactions among the various components of the device components 200, communication with external devices via the communication component 204, and storage and retrieval of code and data to and from the memory component 208.

Each application includes executable code to provide specific functionality for the processor 206 and/or remaining components of the enterprise gateway 110. An example of an application executable by the processor 206 includes, but is not limited to, an enterprise management module 210 to receive inputs from an identified customer to commission, configure, or pre-define a list of cards for users associated with that customer and provides one or more cards to each user mobile device 114-118 registered with the enterprise gateway 110.

Data, stored by the memory component 208, is information that may be referenced and/or manipulated by an operating system or application for performing functions of the enterprise gateway 110. Examples of data stored by the memory component 208 may include, but are not limited to, a card template 212 and a card service table 214. The card template includes one or more characteristics of a card such as includes a template identification, a title field, an image field, data fields, and/or action fields 216, 218. Action fields are predetermined operation of a subject card that, when selected by a user of the associated user mobile device, activates a function related to the card service corresponding to the subject card. The card service table 214 maintains target information ("Target Info") associated with a list of cards for implementing or generating each card with an applicable card service.

The device components 200 of the enterprise gateway 110 may further comprise Input/Output (I/O) interfaces 220 having one or more input components and/or one or more output components. The I/O interfaces 220 of the device components 200 may include one or more visual, audio, mechanical, and/or other components. A user interface 222 of the device components 200 may include portions of the input and output components of the I/O interfaces 220 and be used to interact with a user of the enterprise gateway 110. For example, the user interface 222 may include a combination of hardware and software to provide a user with a desired user experience.

It is to be understood that FIG. 2 is provided for illustrative purposes only to represent examples of the device components 200 of the enterprise gateway 110 and is not intended to be a complete diagram of the various components that may be utilized by each device. The enterprise gateway 110 may include various other components not shown in FIG. 2, may include a combination of two or more components, or a division of a particular component into two or more separate components, and still be within the scope of the present invention.

Figure 3:
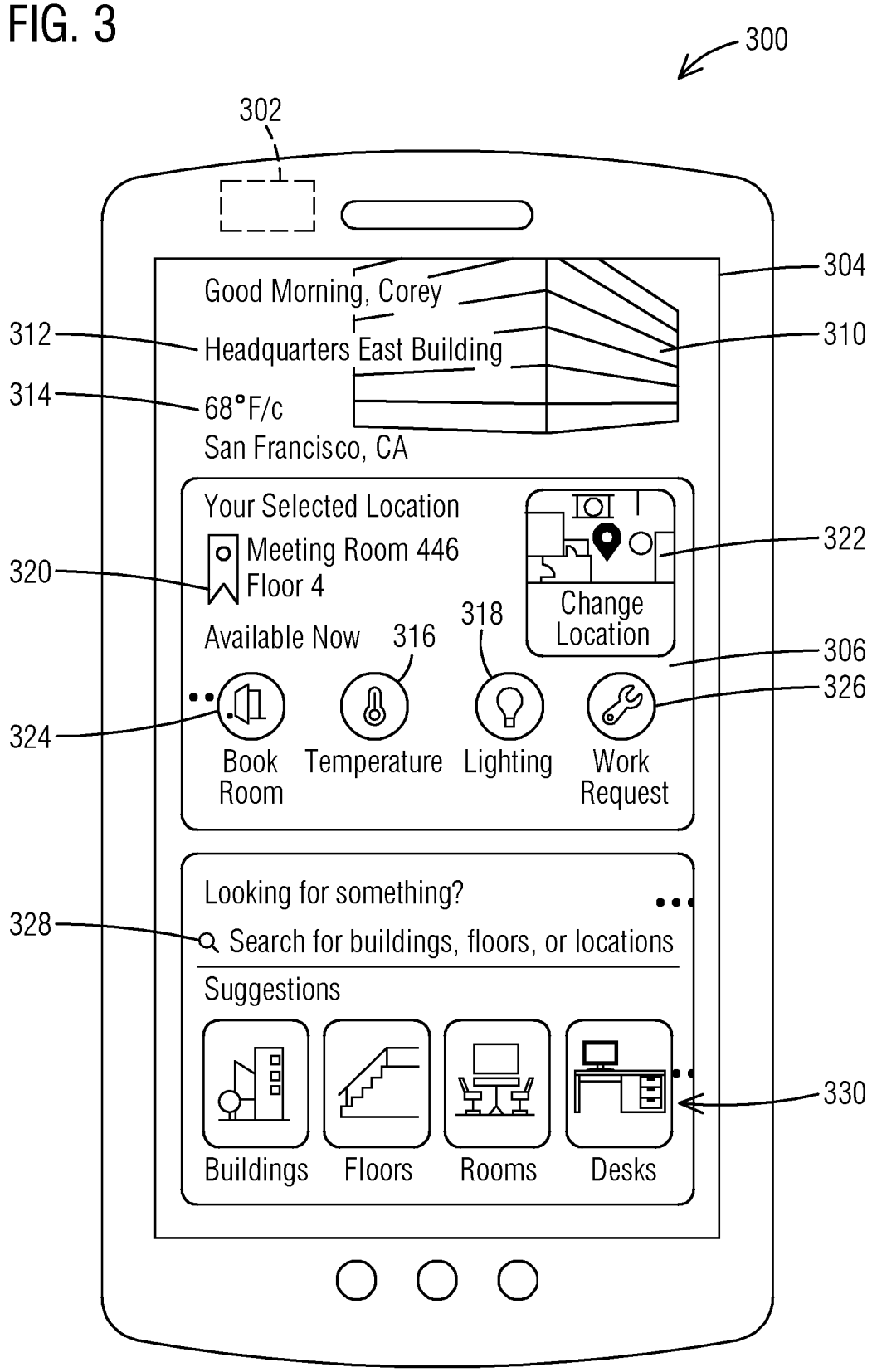
FIG. 3 is a front planar view of an example implementation of an interface for a user mobile device of FIG. 1.

Referring to FIG. 3, an example implementation of an interface 300 for a user mobile device 114-118. A communication component 302, integrated within a housing of the user mobile device 114-118, may receive cards from the enterprise gateway 110 via wireless communication in which each card has an assigned rank and is associated with a list of cards defined when the cards are ordered in accordance with the assigned rank. An output component 304 of the user mobile device 114-118, such as a display, displays or otherwise provides one or more cards 306, 308 of the list of cards to a user of the device. For some embodiments, the interface 300 of each user mobile device 114-118 provides multiple (i.e., two or more) highest ranked cards 306, 308 of the list of cards at the output component 304 of the user mobile device. For example, the interface may provide the highest ranked cards 306, 308 based on a dimension of the display in which a smaller display dimension may show less cards whereas a larger display dimension may show more cards.

The interface 300 allows a user of the user mobile device 114-118 to view a list of cards in ranked sequence, a portion at a time. For example, the interface 300 may provide the user mobile device 114-118 with the ability to selectively scroll a subset of the list of cards into view of the output component 304. For some embodiments, the interface 300 may also include a main screen 310 to accompany one or more representations of cards 304, 306. The main screen 310 may provide information associated with a local environment of the user mobile device 114-118, such as a device location 312 or local weather conditions 314. The main screen 310 may move in-sync with the cards of the list of cards as the list of cards in-and-out of view or, in the alternative, remain visible at the output component 304 in some form. Examples of remaining visible include, but are not limited to, persistent display of content while the list of cards move or reduction of content or size as cards move within boundaries of the interface 300.

Each card of the list of cards may include content associated with a variety of different functions of the user mobile device 114-118. For some embodiments, specific content provided by the cards may be based on the location of the user mobile device at the time of request, permissions delegated to the user, or other administrative considerations. For some embodiments, card content may be based on a building environment as a result of device location or user request, such as adjusting temperature of a space 316, adjusting lighting of the space 318, building access such as a bar or QR code read by a smart card reader, viewing availability of a building area 320, viewing a map of the building area 322, booking the building area 324, booking a building assets such as a desk, filing a maintenance work order 326. For some embodiments, card content may be based other information of interest such as sending a request to a search engine 328; seeking suggested information about a building, floor, room, or asset 330; finding a colleague; or information associated with an external or $3^{rd}$ party environment, such as viewing traffic information, commute information, or parking availability associated with the location of the user mobile device.

As described above, the enterprise gateway 110 includes one or more card templates 146, 212, and each card template may include one or more characteristics of a card. Examples of such characteristics include, but are not limited to, a template identification, a title field, an image field, data fields, and/or action fields. Referring to an example template in FIG. 4A, each of the multiple cards may have a structure corresponding to one of multiple of pre-defined user interface card templates. Each user interface card template 400 includes a template identification (ID) and text content 402, image content 404, or both text and image content. The text content 402 of a user interface card template 400 may include a title field 406, one or more data fields 408, and/or one or more action fields 410. For example, the title field 406 may identify the content of the template 400, the data field 408 may provide more detailed information relative to the title field about the template 400, and the action field 410 may activate a function to be performed by the interface or user mobile device in response to selection of the action field at a user interface. For some embodiments, a template having only text content 402 may designate a null value for the image content 404 to indicate that there is no image for the card.

Figure 4A:
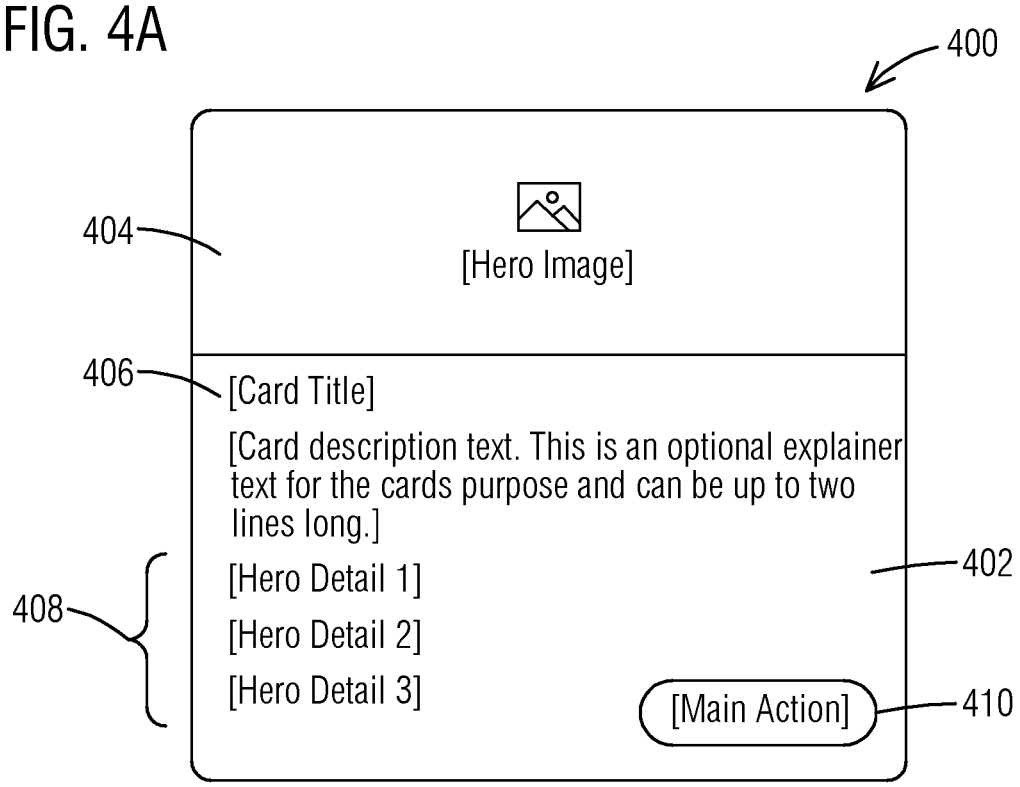
FIGS. 4A-4F depict example implementations of templates that may be used to develop an interface for a user mobile device of FIG. 1.
Figure 4B:
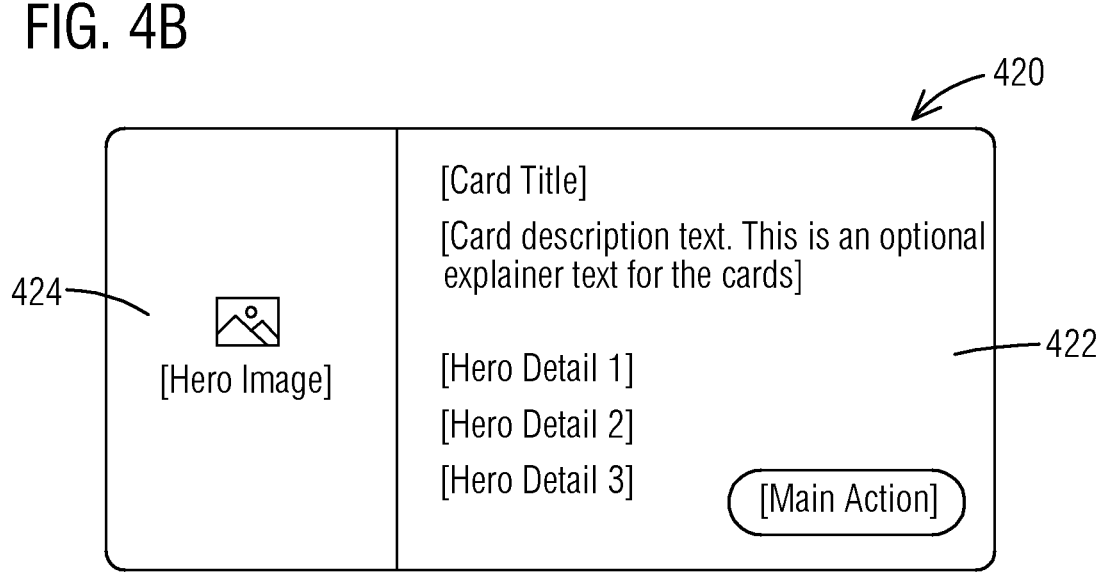

Referring to the example templates of FIGS. 4A and 4B, the text and image fields 402, 404 may be position vertically adjacent to each other for some templates 400 while the text and image fields 422, 424 may be positioned horizontally adjacent to each other for other templates 420.

Figure 4C:
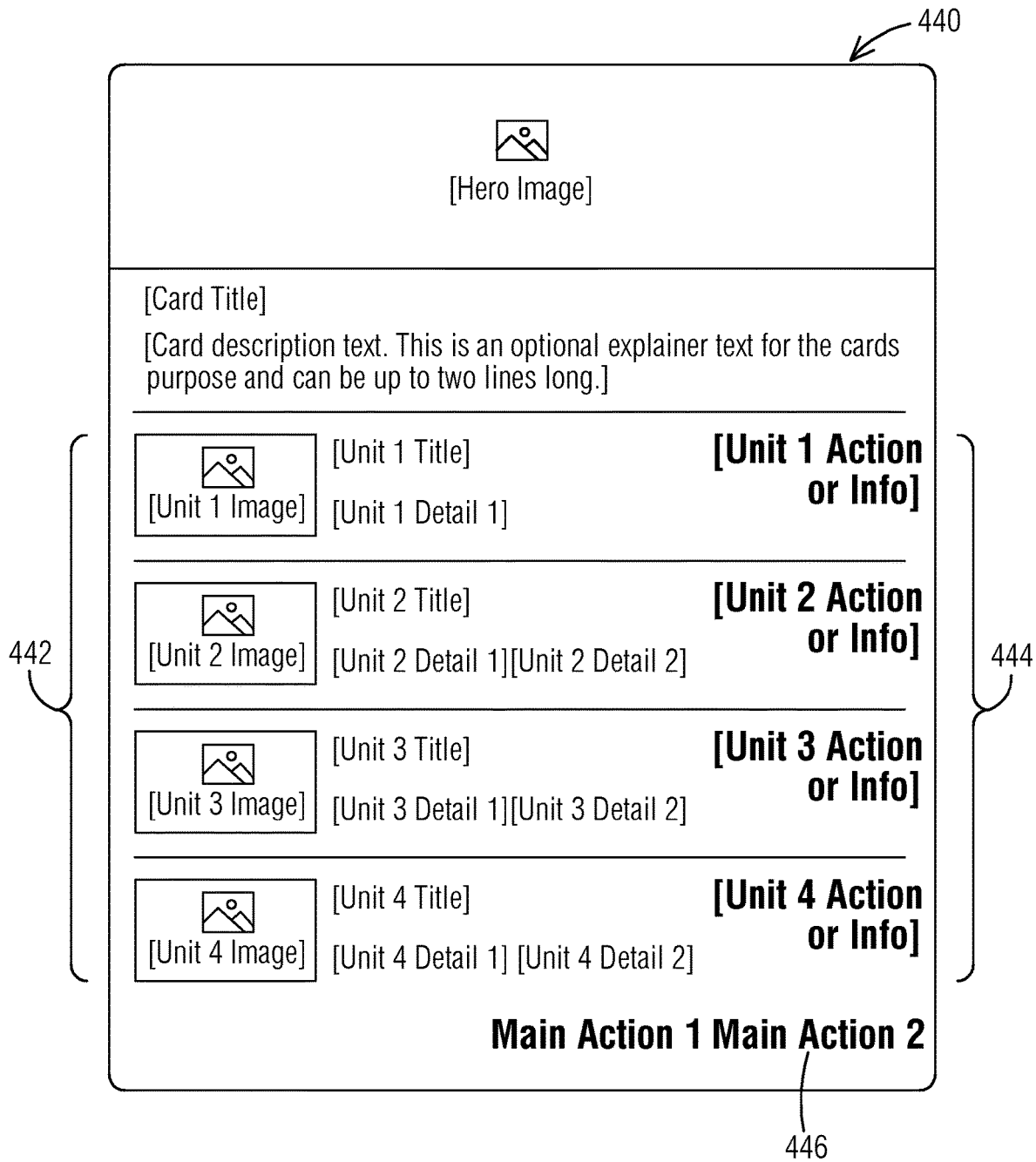

Referring to the example templates of FIGS. 4C, 4D, 4E, and 4F, some templates 440, 460, 480, 490 may include multiple data fields, multiple action fields, or a combination of both data and action fields where each action field corresponds to a data field. FIG. 4C, in particular, shows one embodiment in which multiple data fields 442 associated with corresponding action fields 444. It is to be noted that, as illustrated by example in FIG. 4C, additional data fields 442 and/or action fields 444 may be provided and the fields do not necessarily need to correspond to each other.

Figure 4D:
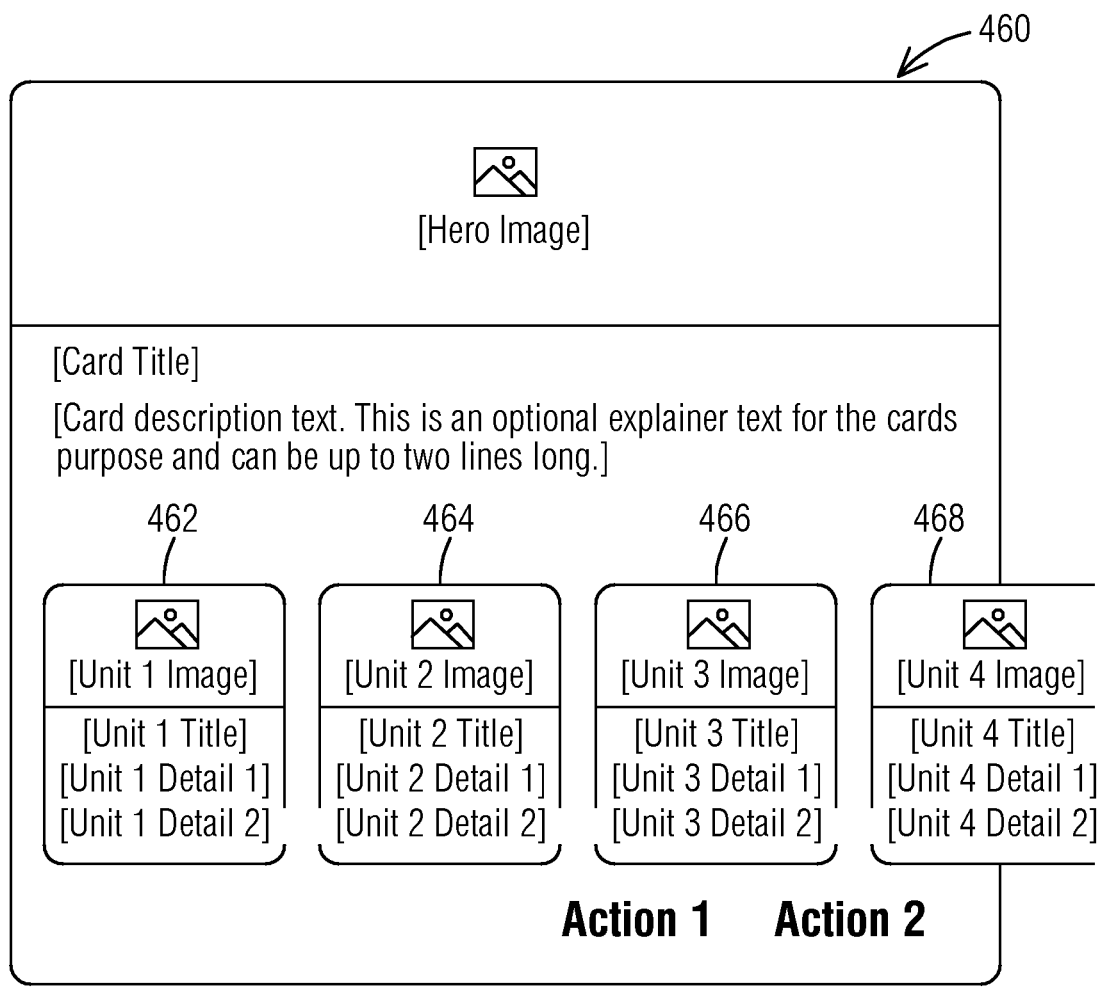

Referring specifically to the example template of FIG. 4D, some embodiments of the templates 460 allow selectively scrolling a subset of the list of cards into view of the display. The interface may allow this carousel feature to operation for a list of cards ordered by assigned rank. To view data and/or action fields beyond the boundary of a particular card, the user interface provides for scrolling of data fields, action fields, or both data and action fields 462-468 to scroll relative to the associated card. For example, as shown in FIG. 4D, the given card may provide for horizontal scrolling of data/action fields 462-468, which is particularly helpful for a list of cards that scroll in the vertical direction.

Figure 4E:
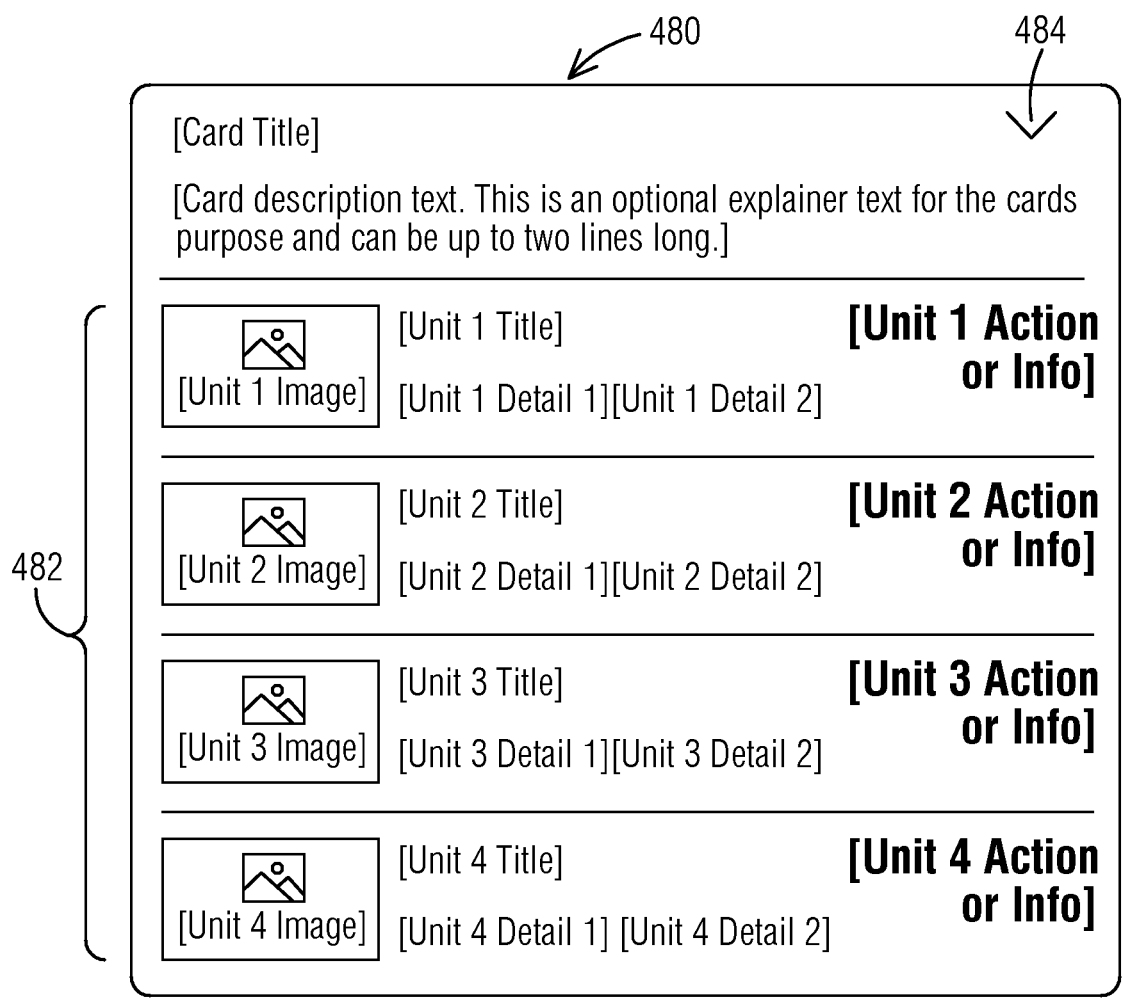
Figure 4F:
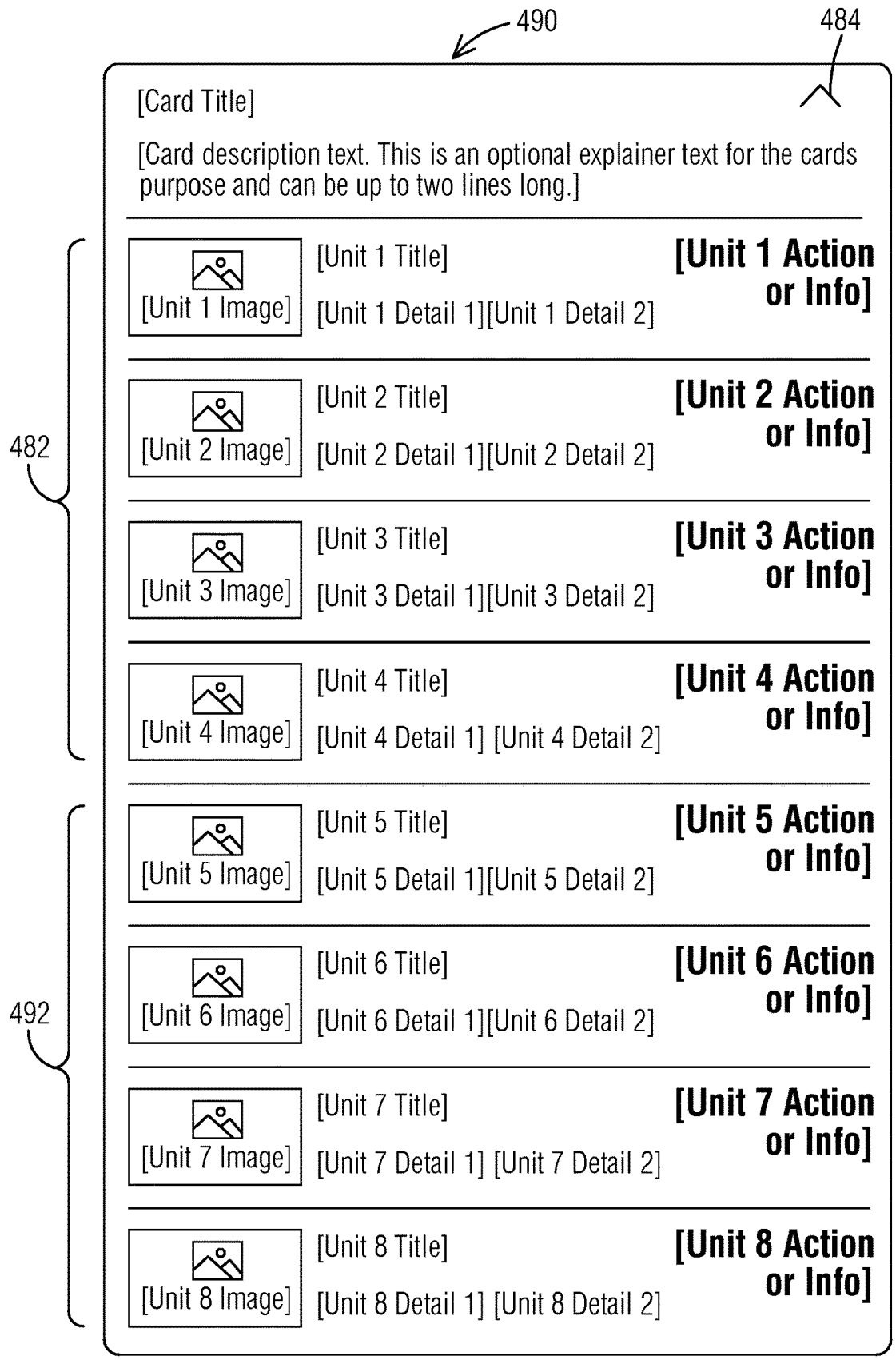

Referring specifically to the example templates of FIGS. 4E and 4F, some embodiments of the templates 480, 490 of the interface allow the extension of a first subset 482 of a group of data and/or actions to bring into view a larger subset, or the entire group, of data and/or actions at the display. For example, the larger subset may include the first subset 482 and add a second subset 492 adjacent to the first subset. This feature of extending a list of data and/or actions may also include an indicator 484 to distinguish an extended group from a non-extended group of data fields, action fields, and/or combinations of data and action fields.

Figure 5:
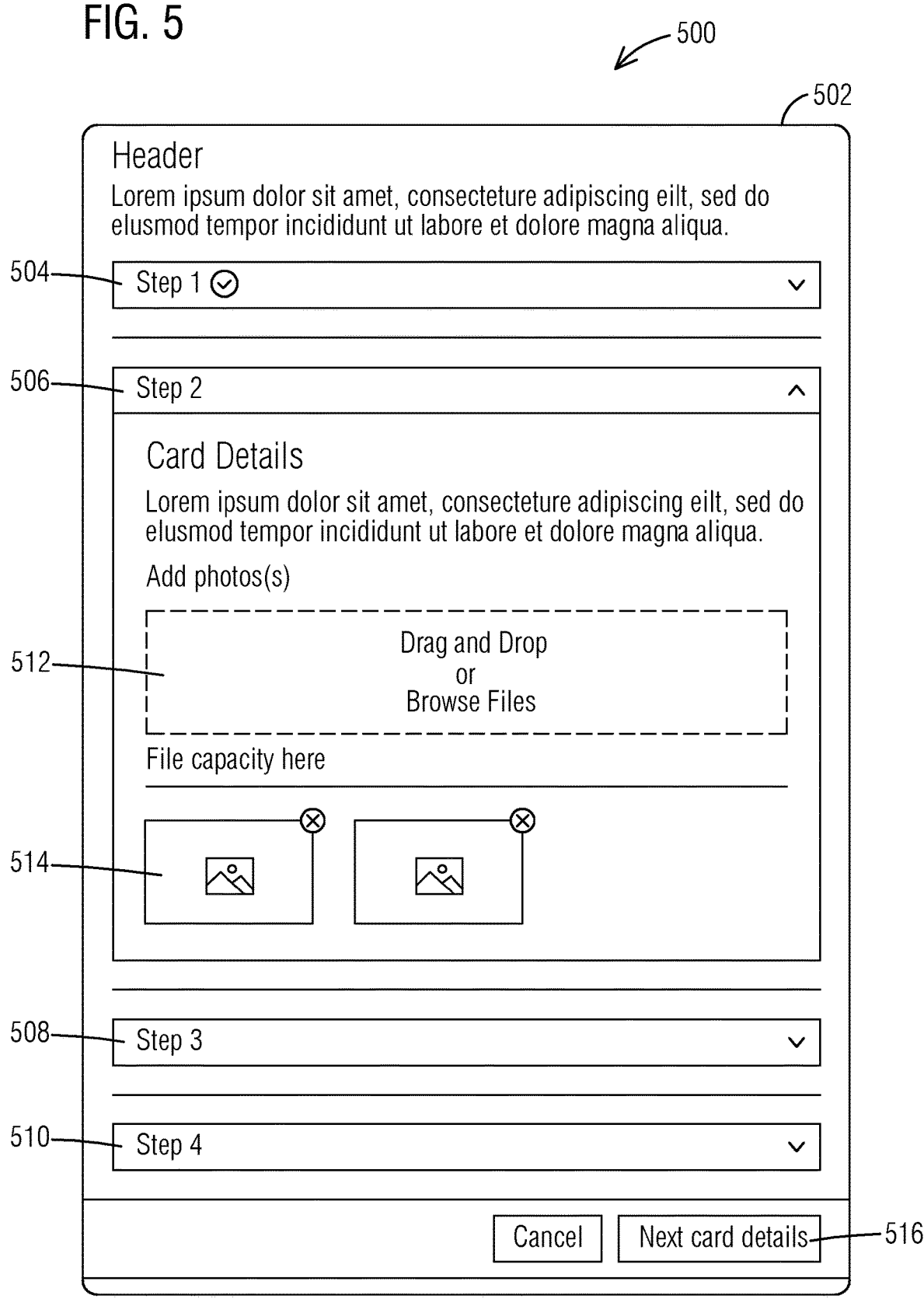
FIG. 5 is a display view of an example implementation for configuring cards.

Referring to FIG. 5, there is shown a configuration view 500 of an example implementation for configuring cards. The configuration of cards may occur automatically by the processor 206 of the enterprise server 110 and/or manually at a user interface 22 of the server or the output component 304 of the user mobile device 114-118. Thus, for automatic configuration of cards, the configuration view 500 shown in FIG. 5 would be a virtual representation of an operation of the enterprise server 100 and not an actual view at a display. The configuration view 500 represents a location of memory or a user interface 502 that provides various actions 504-510 to generate or configure a card. For example, the configuration view 500 may include a header action 504 to generate or configure a header for the card. As another example, the configuration view 500 may include a card details action 506 to generate one or more details for the card, such as adding an image to the card (512) or adding multiple images to the card (514). As yet another example, the configuration view 500 may include further actions 508, 510 to configure the card, such as adding text, associating a template, and the like. The configuration view 500 may also depict a next action 516 for processing and completing the card as some or all details are identified for the card.

Figure 6:
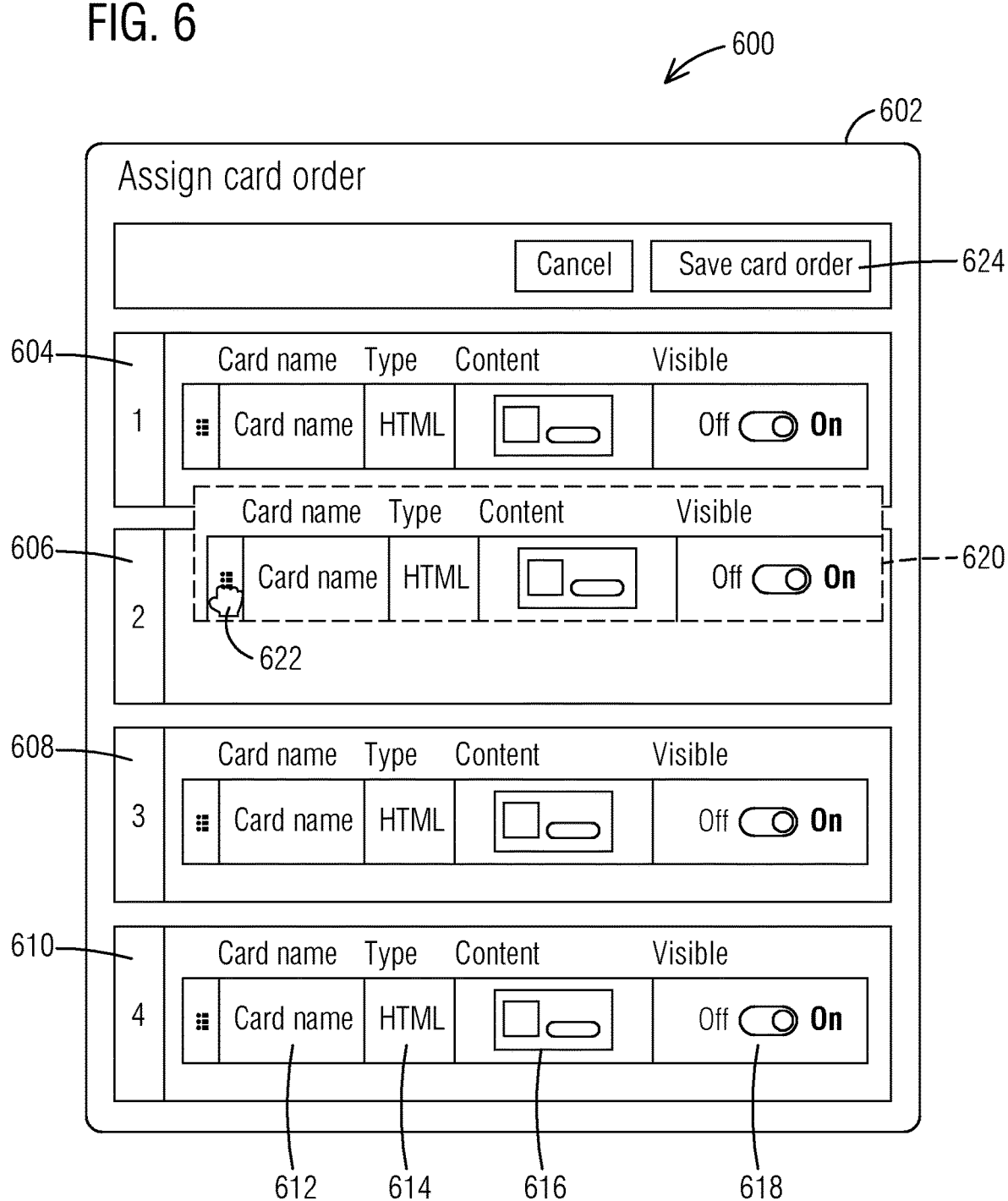
FIG. 6 is a display view of an example implementation for assigning and ranking cards in accordance with the techniques described herein.

FIG. 6 is a rank view 600 of an example implementation for assigning and ranking cards. The ranking of cards may occur automatically by the processor 206 of the enterprise server 110 and/or manually at a user interface 22 of the server or the output component 304 of the user mobile device 114-118. Similar to the configuration view 500 of FIG. 5, for automatic configuration of cards, the rank view 600 shown in FIG. 6 would be a virtual representation of an operation of the enterprise server 100 and not an actual view at a display. The rank view 600 represents a location of memory or a user interface 602 that provides various actions 504-510 to assign and rank a card. The rank view 500, whether virtual or actual, includes metadata for multiple cards 604-610 that are some or all cards of a list of cards. Each card 604-610 includes multiple properties about the card including one or more of the following: a card identification 612, a card type 614, one or more card details 616, and a card status. An example of a card type 614 includes, but is not limited to, a protocol or format for specifying the content of the card, such as HTML. Examples of card details 616 include, but are not limited to, card text, card images, card actions, and card templates. An example of a card status includes, but is not limited to, a visibility of the card at the output component 304 of the mobile device 114-118.

As determined by the enterprise gateway 100 and/or the mobile device 114-118, a rank may be assigned to each card based at least in part on a user target profile associated with the user mobile device and the customer identification. Each card is associated with a list of cards defined when cards are ordered in accordance with the assigned rank. For example, each card representation 620 of the rank view may be assigned a rank and reordered before or after one or more other cards. An action 622 of the enterprise server 100 or the mobile device 114-118, whether automatic or manual, may change the ranking of the card representation 620 relative to other cards. In response to assigning a rank to one or more cards and/or otherwise ordering the cards, the rank view 500 may also include a next action 624 for processing and completing the cards as some or all of them are assigned and ranked.

Referring to FIG. 7, there is shown an example implementation of a card service table 148, 214 that may be used to develop an interface for a user mobile device. A list of pre-defined card may be maintained by the enterprise gateway 110 in the card service table 148, 214 in association with the target information ("Target Info") for implementing or generating the respective card with an applicable card service. The Target Info includes a card service 702 associated with a service provided by an internal or external source and one or more card filters 704-710 to determine which services to associate with a particular user mobile device 114-118. As explained above, card services 702 are associated with data received by the user mobile device 114-118 relevant to a pre-defined card for receiving data relevant to the respective service or functionality. Examples of card services 702 include, but are not limited to, internal services 712, 714, such as building environment control, building services, room selection, and person/asset scheduling, and external services 716, such as third party services associated with passive or interactive information managed by services external to the building management systems.

The card filters 704 are used to identify cards relevant to a particular user mobile device 114-118. Examples of card filters 704 includes, but are not limited to, customer identification 704 associated with the user mobile device 114-118, a particular asset 706 associated with the user mobile device (such as a building), and a location 708 of the user mobile device (such as a geographic location, network identification, or network address). Card filters 704 may further include upstream information 710 that may be used to identify cards relevant to the user mobile device 114-118, such as data or a data source associated with the mobile device and/or the card. For some embodiments, the card service table 148, 214 may include one or more default services for access by all user mobile devices 114-118 or for initial access by user mobile devices until one or more other card services 702 are assigned.

The gateway 110 may deploy the list of cards to the corresponding mobile app 124-128 of the user mobile device 114-118 associated with the identified customer in multiple ways. Example of such deployment include, but are not limited to, deployment upon request from the user mobile device, in response to downloading, first time login of the mobile app 124-128, or upon request or notice of a change in condition associated with a location of the user mobile device and a card associated with the identified customer. After initial request or a change in condition or upon prompt from a user mobile device 114-118 for a new session, the gateway 110 may re-rank the order of the cards for the identified customer based on pre-defined scoring function that determines which cards are to be shown to the user and in which order. Such reranking may be stored by updating the card service table 148, 214 to reflect the reorder.

Figure 8A:
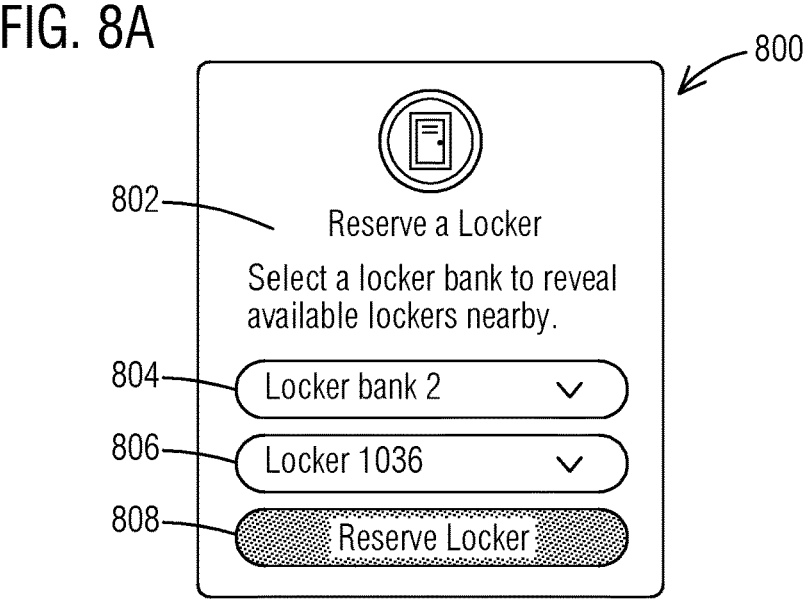
FIGS. 8A-8C are screen views of example implementations for 2-way cards.
Figure 8B:
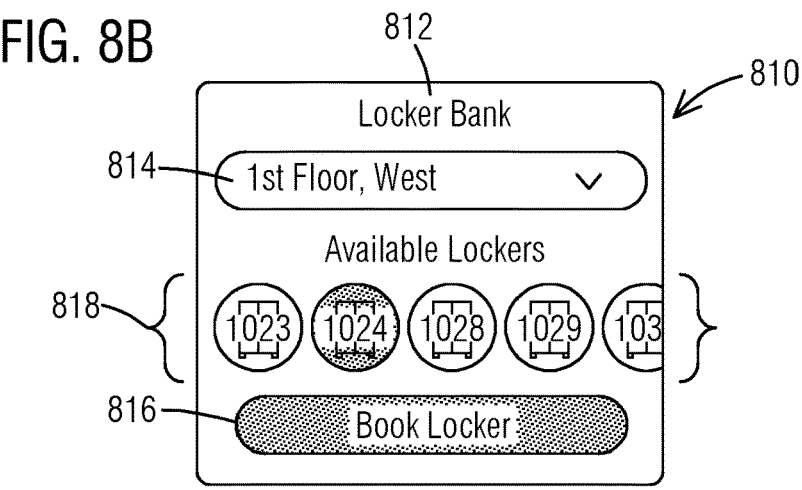
Figure 8C:
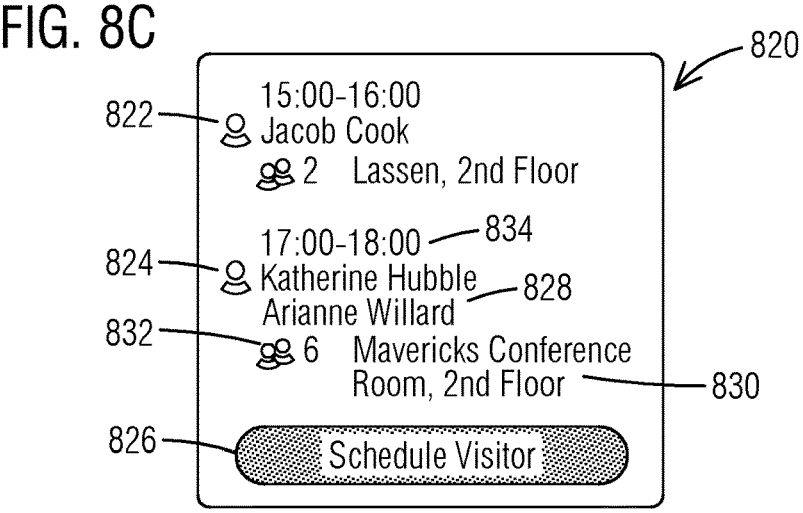
Figure 9:
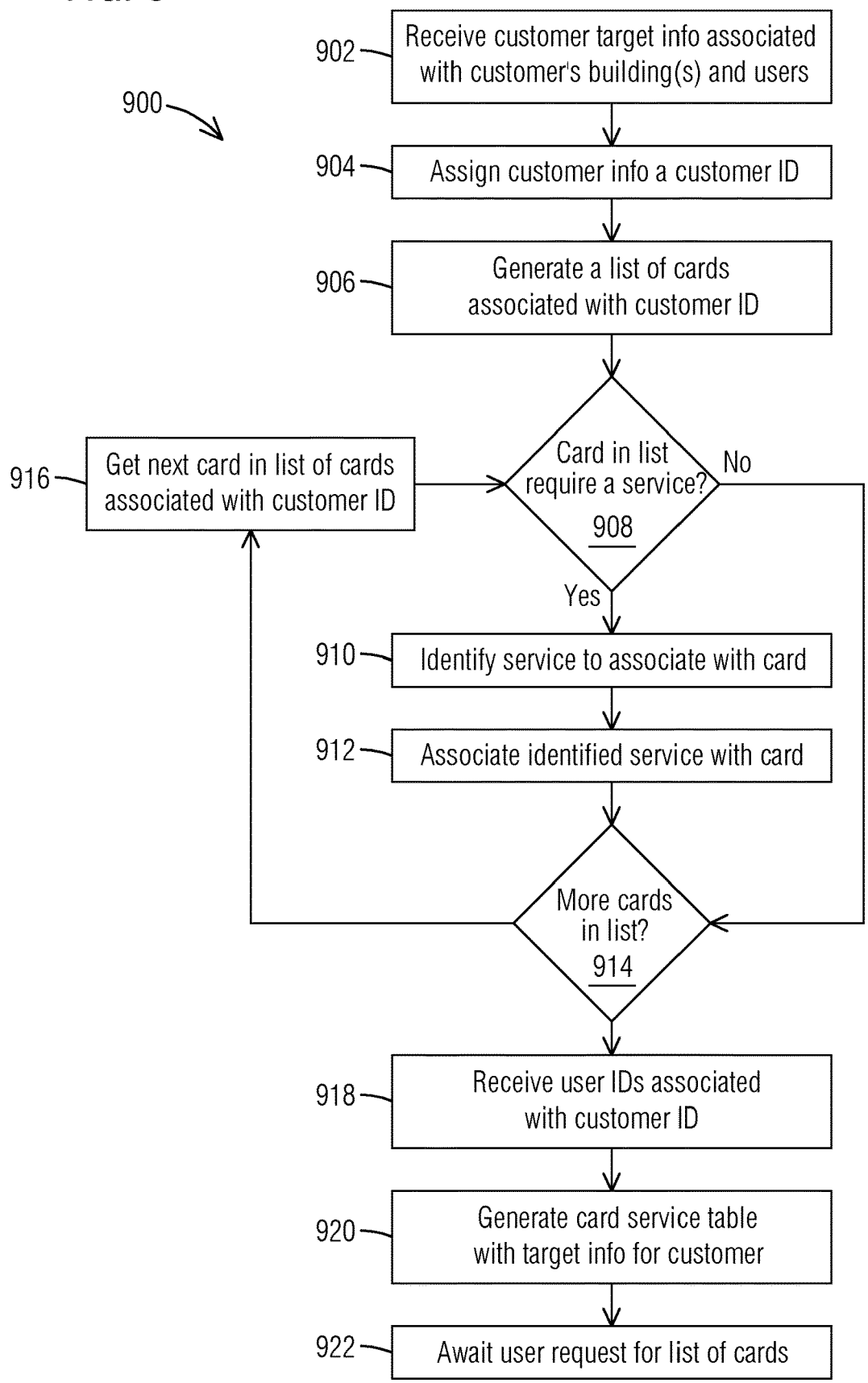
FIG. 9 is a flow diagram of an example commissioning operation of the enterprise gateway of FIG. 1.

FIGS. 8A-8C are screen views of example implementations for 2-way cards. For some embodiments, a particular card may be classified as a 1-way card in which information is provided at the user mobile device 114-118. For other embodiments, a particular card may be classified as a 2-way card in which incoming information from the gateway server 100 or third party services 138-142 is provided at the user mobile device 114-118 and outgoing information from the user mobile device is provided to the gateway server or third party service. FIG. 8A depicts a first example embodiment for an asset management system 800, such as a storage reservation 802, in which the user mobile device 114-118 may select an asset location 804, and an asset identification 806, and a reservation request 808. FIG. 8B depicts a second example embodiment for a similar asset management system 810, such as again a storage reservation 812, in which some aspects are of the system 810 are similar to the first example embodiment whereas other aspects are not. For example, user mobile device 114-118 may select an asset location 814 via a dropdown menu and submit a reservation request 816 via a virtual button, but the user mobile device may scroll through a carousel of available lockers to allow selection of the asset identification 818. FIG. 8C depicts a third example embodiment for a user management system 820, such as a visitor scheduling 802, in which the user mobile device 114-118 may select among multiple opportunities 822, 824 for a visitor and a scheduling request 826. For example, each opportunity 822, 824 for the scheduling request may include one or more of the following: one or more people 828 to connect with the visitor, a location 830 to connect with the visitor (such as a conference room), a number of people 832 at a particular meeting location, and/or a time or time period 834 associated with the requested meeting Referring to FIG. 9, there is shown a flow diagram of an example commissioning operation 900 of the enterprise gateway 100. For this commissioning operation 900, the enterprise gateway 100 may receive customer target information associated with a customer's building(s) and users (902). The enterprise gateway 100 may then assign a customer identification (ID) to the customer target information in response to receiving the customer target information (904). The enterprise gateway 100 may then generate a list of cards from the multiple cards and associated the list of cards with the customer identification in response to assigning the customer identification (906).

The commissioning operation 900 includes the capability of the enterprise gateway 100 to identify and process cards that require one or more services. In particular, the enterprise gateway 100 may determine whether a particular card of the list of cards requires one or more services (908). For those cards that require a service, the enterprise gateway 100 identifies the service or services to be associated with the card (910) and associate the service or services with the card (912). In response to associating a service with a card (912) or determining that the particular card does not require a service (908), the commissioning operation 900 may determining whether there are more cards in the list of cards that have not been reviewed (914). If there are more cards in the list (914), then the commissioning operation 900 may identify the next card in the list of cards associated with the customer identification (916) and return to determining whether the particular card, i.e., the next card, requires one or more services (908).

After all cards in the list have been considered by the commissioning operation 900, the enterprise gateway 100 receives one or more user identifications associated with the customer identification (918). A card service table 148, 214 is generated based on the target information for the associated customer (920). Thereafter, in accordance with the commissioning operation 900, the enterprise gateway 100 awaits a user request from one or more user mobile devices 114-118 for the list of cards (922).

Figure 10:
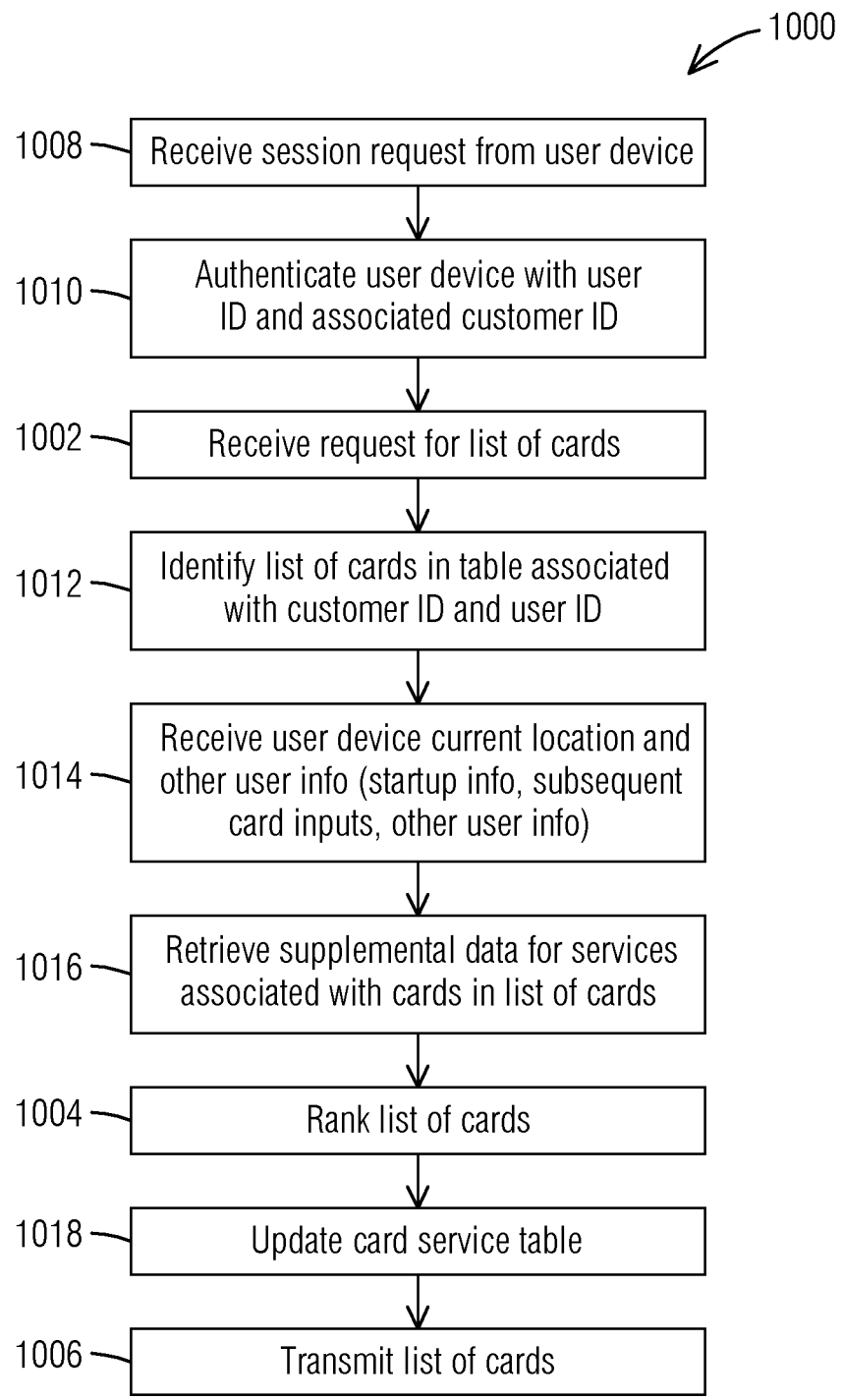
FIG. 10 is a flow diagram of an example general operation of the enterprise gateway of FIG. 1.

Referring to FIG. 10, there is shown a flow diagram of an example general operation 1000 of the enterprise gateway 100. For the general operation 1000, the enterprise gateway 100 receives a request from a user mobile device 114-118 for cards associated with a customer identification of a building management system (1002). Each card has a structure corresponding to one of the pre-defined user interface card templates 146, 212 stored at the enterprise gateway 100. For example, each user interface card template 146, 212 may include a template ID, a title field and at least one of an image field, a data field, or an action field. In response to receiving the request (1002), the enterprise gateway 100 determines an assigned rank for each of the cards based at least in part on a user target profile associated with the user mobile device 114-118 and the customer identification (1004). Each card is associated with a list of cards defined when cards are ordered in accordance with the assigned rank. The user target profile may include at least one of an identification, a location, an environment, or a user action of the user mobile device 114-118. After determining the assigned rank (1004), the enterprise gateway 100 transmits the cards, as associated with the list of cards as ranked, to the user mobile device 114-118 (1006).

For some embodiment, the enterprise gateway 100 may receive a session request from the user mobile device 114-118 (1008) before receiving the request for the list of cards (1002). The enterprise gateway 100 may authenticate the user mobile device 114-118 with the user identification and associated customer identification (1010) in response to receiving the session request (1008).

For some embodiments, the enterprise gateway 100 may receive user mobile device data from the user mobile device (1014) with the request or in response to the request. For example, the enterprise gateway 100 may identify the list of cards in the card service table 148, 214 associated with the customer identification and the user identification (1012). The enterprise gateway 100 may receive the user mobile device data (1014) in response to identifying the cards (1012). The enterprise gateway 100 may also determine the user target profile based on the user mobile device data. The user mobile device data may include at least one of automated device collected data, user input data, or semi-automated user input data. For example, the enterprise gateway 100 may receive automated device collected data from the user mobile device 114-118 such as startup information, a current location of the device, or occupancy of its environment based on a service tracking function of the mobile app 124-128. As another example, the enterprise gateway 100 may receive user input data (such as subsequent card inputs) from the user mobile device 114-118 such as a current location or action associated with a given card at a user interface of the mobile app 124-128. As yet another example, the enterprise gateway 100 may receive semi-automated user input data from the user mobile device 114-118 such as a confirmation message of the user in response to a device determined location, collected bar/QR code scan, collected occupancy detection, and the like. In response to receiving the user mobile device data, the enterprise gateway 100 determines an assigned rank for each of the cards based at least in part on a user target profile associated with the user mobile device 114-118 and the customer identification (1004).

For some embodiments, the enterprise gateway 100 may determine, or have previously determine, that there is one or more services associate with one or more cards of the list of cards (1016). The cards includes a service card associated with a service provided by an internal system or external service provider as described above in reference to the interface 300 of FIG. 3. For example, the service card may correlate the user target profile with the service provided by the internal system or external service provider. In response to determining the service or services, the enterprise gateway 100 determines an assigned rank for each of the cards based at least in part on a user target profile associated with the user mobile device 114-118 and the customer identification (1004). It is to be noted that the enterprise gateway 100 may update the card service table 148, 214 based on the assigned ranks determined by the gateway (1018) for any of the embodiments described above.

Figure 11:
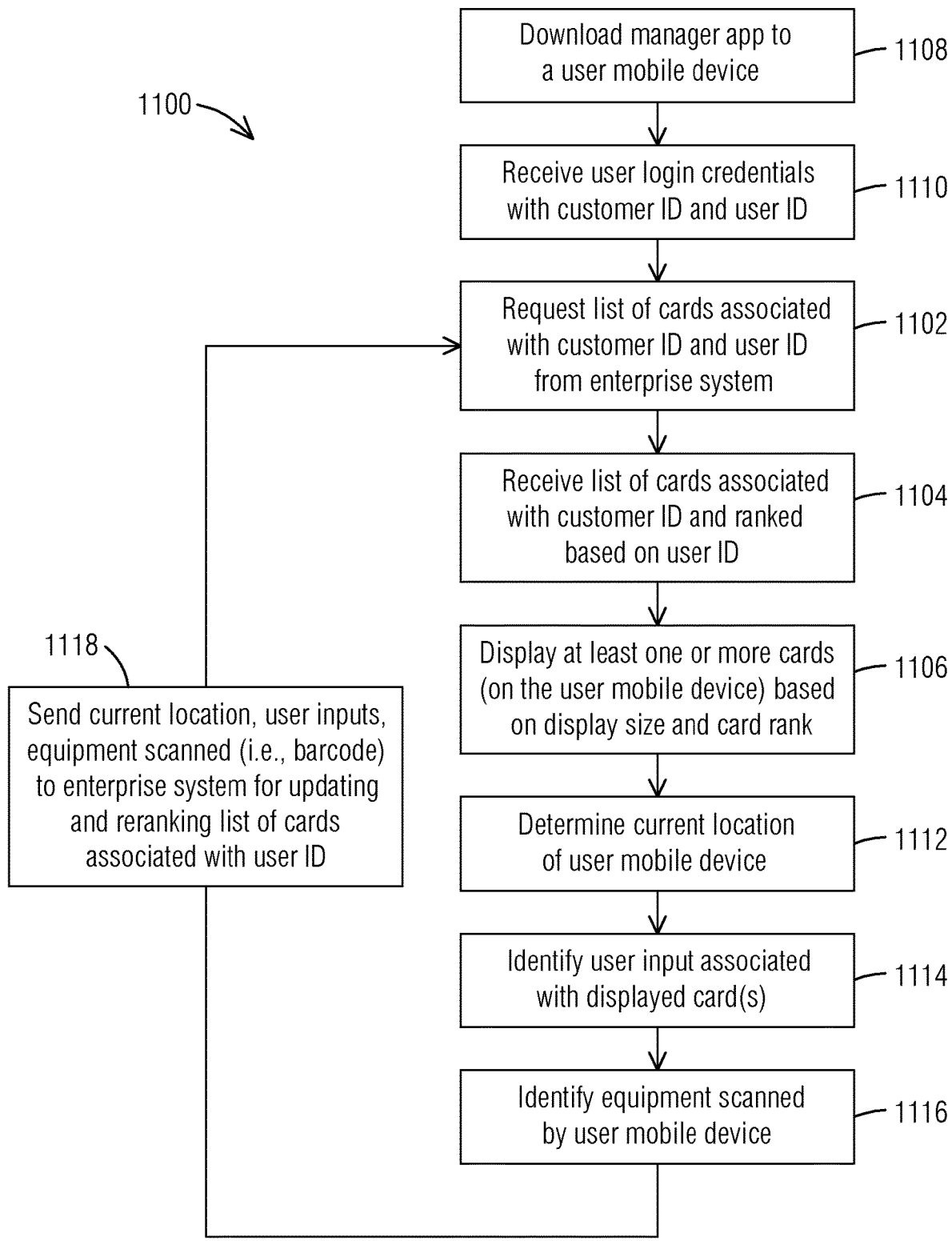
FIG. 11 is a flow diagram of an example general operation of a user mobile device of FIG. 1.

Referring to FIG. 11, there is shown a flow diagram of an example general operation 1100 of a user mobile device 114-118. For the general operation 700, the user mobile device 114-118 transmits a request for cards associated with a customer identification of a building management system (1102). Each card has a structure corresponding to one of a plurality of pre-defined user interface card templates. Concurrently with the request or in response to transmitting the request, the user mobile device 114-118 may transmit user mobile device data to the enterprise gateway in which the user target profile is based on the user mobile device data. In response to transmitting the request (1102), the user mobile device 114-118 receives the cards from the enterprise gateway 100 in response to the request (1104). Each card has an assigned rank and being associated with a list of cards defined when the cards are ordered in accordance with the assigned rank. The assigned rank of a respective card is based at least in part on a user target profile associated with the user mobile device and the customer identification. In response to receiving the cards (1104), the user mobile device 114-118 provides one or more cards of the list of cards at a display of the user mobile device (1106). As described above, the cards may be provided in a variety of ways. For example, multiple highest ranked cards of the list of cards may be provided at the display of the user mobile device 114-118 based on a dimension of the display. As another example, a subset of the list of cards may be selectively scrolled to come into view of the display in accordance with the assigned rank.

For some embodiments, the user mobile device 114-118 may perform one or more preliminary operations (1108), (1110) before receiving the list of cards from the enterprise system 100 (1102). For example, the user mobile device 114-118 may download a mobile app 124-128 from the enterprise system 100 (1108). As another example, the user mobile device 114-118 may receive user login credentials with the customer identification and the user identification (1110) in order to authenticate with the enterprise system 100.

For some embodiments, the user mobile device 114-118 may collect and/or process information to be provided to the enterprise system 100 (1112-1118). In particular, the user mobile device data provided to the enterprise system 100 may include at least one of automated device collected data, user input data, or semi-automated user input data. For example, the user mobile device 114-118 may provide automated device collected data at the user mobile device, such as startup information, a current location of the device, or occupancy of its environment based on a service tracking function of the mobile app 124-128 (1112). As another example, the user mobile device 114-118 may provide user input data (such as subsequent card inputs) detected at a user interface of the user mobile device, such as a current location or action associated with a given card of the mobile app 124-128 (1114). As yet another example, the user mobile device 114-118 may provide semi-automated user input data of the user mobile device, such as a confirmation message of the user in response to a device determined location, collected bar/QR code scan, collected occupancy detection, and the like (1116). The user mobile device 114-118 may then transmit the collected and/or process information to the enterprise system 100 (1118) so that the information may be considered by the enterprise gateway 100 in determining an assigned rank for each of the cards.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A method in a user mobile device comprising:
transmitting a request for a plurality of cards associated with a customer identification of a building management system, each of the plurality of cards having a structure corresponding to one of a plurality of pre-defined user interface card templates;
receiving the plurality of cards from an enterprise gateway in response to the request, each of the plurality of cards having an assigned rank and being associated with a list of cards defined when the plurality of cards are ordered in accordance with the assigned rank, the assigned rank of a respective card being based at least in part on a user target profile associated with the user mobile device and the customer identification; and
providing at least one card of the list of cards at a display of the user mobile device.

2. The method as described in claim 1, wherein the user target profile includes at least one of an identification, a location, an environment, or a user action of the user mobile device.

3. The method as described in claim 1, further comprising transmitting user mobile device data to the enterprise gateway, wherein:
the user target profile is based on the user mobile device data; and
the user mobile device data includes at least one of automated device collected data, user input data, or semi-automated user input data.

4. The method as described in claim 1, wherein:
the plurality of cards includes a service card associated with a service provided by an external service provider; and
the service card correlates the user target profile with the service provided by the external service provider.

5. The method as described in claim 1, wherein providing at least one card comprises providing a plurality of highest ranked cards of the list of cards at the display of the user mobile device based on a dimension of the display.

6. The method as described in claim 1, wherein providing at least one card comprises selectively scrolling a subset of the list of cards into view of the display in accordance with the assigned rank.

7. The method as described in claim 1, wherein each user interface card template includes a template ID, a title field and at least one of an image field, a data field, or an action field.

8. A user mobile device comprising:
a communication component configured to transmits a request for a plurality of cards associated with a customer identification of a building management system and receives the plurality of cards from an enterprise gateway in response to the request,
wherein each of the plurality of cards having a structure corresponding to one of a plurality of pre-defined user interface card templates, and
wherein each of the plurality of cards having an assigned rank and being associated with a list of cards defined when the plurality of cards are ordered in accordance with the assigned rank, the assigned rank of a respective card being based at least in part on a user target profile associated with the user mobile device and the customer identification; and
an output component configured to provide at least one card of the list of cards.

9. The user mobile device as described in claim 8, wherein the user target profile includes at least one of an identification, a location, an environment, or a user action of the user mobile device.

10. The user mobile device as described in claim 8, wherein:
the communication component transmits user mobile device data to the enterprise gateway;
the user target profile is based on the user mobile device data; and
the user mobile device data includes at least one of automated device collected data, user input data, or semi-automated user input data.

11. The user mobile device as described in claim 8, wherein:
the plurality of cards includes a service card associated with a service provided by an external service provider; and
the service card correlates the user target profile with the service provided by the external service provider.

12. The user mobile device as described in claim 8, wherein the output component provides a plurality of highest ranked cards of the list of cards based on a dimension of the output component.

13. The user mobile device as described in claim 8, wherein output component selectively scrolls a subset of the list of cards into view of the output component in accordance with the assigned rank.

14. The user mobile device as described in claim 8, wherein each user interface card template includes a template ID, a title field and at least one of an image field, a data field, or an action field.

15. A method of an enterprise gateway comprising:
receiving a request from a user mobile device for a plurality of cards associated with a customer identification of a building management system, each card having a structure corresponding to one of a plurality of pre-defined user interface card templates;
determining an assigned rank for each of the plurality of cards based at least in part on a user target profile associated with the user mobile device and the customer identification, each of the plurality of cards being associated with a list of cards defined when the plurality of cards are ordered in accordance with the assigned rank; and
transmitting the plurality of cards to the user mobile device.

16. The method as described in claim 15, wherein the user target profile includes at least one of an identification, a location, an environment, or a user action of the user mobile device.

17. The method as described in claim 15, further comprising receiving user mobile device data from the user mobile device, wherein:
the user target profile is based on the user mobile device data; and
the user mobile device data includes at least one of automated device collected data, user input data, or semi-automated user input data.

18. The method as described in claim 15, wherein:
the plurality of cards includes a service card associated with a service provided by an external service provider; and
the service card correlates the user target profile with the service provided by the external service provider.

19. The method as described in claim 15, wherein each user interface card template includes a template ID, a title field and at least one of an image field, a data field, or an action field.

20. An enterprise gateway comprising:
a communication component configured to receive a request from a user mobile device for a plurality of cards associated with a customer identification of a building management system and transmit the plurality of cards to the user mobile device, each card having a structure corresponding to one of a plurality of pre-defined user interface card templates; and
a processor configured to determine an assigned rank for each of the plurality of cards based at least in part on a user target profile associated with the user mobile device and the customer identification, each of the plurality of cards being associated with a list of cards defined when the plurality of cards are ordered in accordance with the assigned rank.

21. The enterprise gateway as described in claim 20, wherein the user target profile includes at least one of an identification, a location, an environment, or a user action of the user mobile device.

22. The enterprise gateway as described in claim 20, wherein:
the communication component receives user mobile device data from the user mobile device;
the user target profile is based on the user mobile device data; and
the user mobile device data includes at least one of automated device collected data, user input data, or semi-automated user input data.

23. The enterprise gateway as described in claim 20, wherein:
the plurality of cards includes a service card associated with a service provided by an external service provider; and
the service card correlates the user target profile with the service provided by the external service provider.

24. The enterprise gateway as described in claim 20, wherein each user interface card template includes a template ID, a title field and at least one of an image field, a data field, or an action field.

* * * * *